(12) United States Patent
Kulinsky et al.

(10) Patent No.: US 10,799,952 B2
(45) Date of Patent: Oct. 13, 2020

(54) SELECTIVE LASER SINTERING USING FUNCTIONAL INCLUSIONS DISPERSED IN THE MATRIX MATERIAL BEING CREATED

(71) Applicant: The Regents Of The University Of California, Oakland, KS (US)

(72) Inventors: Lawrence Kulinsky, Los Angeles, CA (US); Edward Tackett, Buckner, KY (US); Benjamin Dolan, Laguna Nigel, CA (US)

(73) Assignee: The Regents of The University of California, Oakland, CA (US)

( * ) Notice: Subject to any disclaimer, the term of this patent is extended or adjusted under 35 U.S.C. 154(b) by 646 days.

(21) Appl. No.: 15/171,991

(22) Filed: Jun. 2, 2016

(65) Prior Publication Data

US 2016/0354840 A1 Dec. 8, 2016

Related U.S. Application Data

(60) Provisional application No. 62/171,146, filed on Jun. 4, 2015.

(51) Int. Cl.
*B22F 3/105* (2006.01)
*B33Y 50/02* (2015.01)
(Continued)

(52) U.S. Cl.
CPC .......... *B22F 3/1055* (2013.01); *B29C 64/153* (2017.08); *B29C 64/218* (2017.08); *B32B 18/00* (2013.01); *C22C 47/14* (2013.01); *B05B 7/1404* (2013.01); *B22F 2003/1056* (2013.01); *B22F 2998/10* (2013.01); *B33Y 10/00* (2014.12); *B33Y 30/00* (2014.12); *B33Y 50/02* (2014.12); *C04B 2235/6026* (2013.01); *C04B 2237/385* (2013.01); *C04B 2237/584* (2013.01); *C22C 2026/002* (2013.01); *Y02P 10/295* (2015.11)

(58) Field of Classification Search
CPC ......... B33Y 30/00; B33Y 40/00; B33Y 70/00; B33Y 99/00; B05B 7/1404; B22F 3/1055; B22F 2003/1056; B29C 64/153; B29C 64/218

See application file for complete search history.

(56) References Cited

U.S. PATENT DOCUMENTS 5,252,264 A * 10/1993 Forderhase ............. B22F 3/004
  156/272.8
5,733,497 A    3/1998 McAlea et al.
(Continued)

FOREIGN PATENT DOCUMENTS

CN    1907602 A    2/2007
CN    103881371 A   6/2014
(Continued)

*Primary Examiner* — Philip C Tucker
*Assistant Examiner* — Jimmy R Smith, Jr.
(74) *Attorney, Agent, or Firm* — Mintz Levin Cohn Ferris Glovsky and Popeo, P.C.

(57) ABSTRACT

A selective laser sintering system includes a leveling roller having a first orientation. The leveling roller is configured to roll over a first feed bin. The build chamber is configured to receive, from the first feed bin and by the leveling roller, a transfer of a portion of matrix material. The selective laser sintering system is configured to transfer the portion to the build chamber in a number of orientations.

7 Claims, 9 Drawing Sheets

(51) Int. Cl.
*C22C 47/14* (2006.01)
*B29C 64/153* (2017.01)
*B29C 64/218* (2017.01)
*B32B 18/00* (2006.01)
B33Y 10/00 (2015.01)
B33Y 30/00 (2015.01)
B05B 7/14 (2006.01)
C22C 26/00 (2006.01)

(56) References Cited

U.S. PATENT DOCUMENTS

| | | | |
|---|---|---|---|
| 6,612,134 | B1 | 9/2003 | Shimoda et al. |
| 6,713,125 | B1 | 3/2004 | Sherwood et al. |
| 6,814,926 | B2 | 11/2004 | Geving et al. |
| 7,569,174 | B2 | 8/2009 | Ruatta et al. |
| 8,114,334 | B2 | 2/2012 | Martinoni et al. |
| 8,119,053 | B1 | 2/2012 | Bedal et al. |
| 2006/0118990 | A1 | 6/2006 | Dierkes et al. |
| 2007/0063372 | A1* | 3/2007 | Nielsen ............... B29C 64/165 264/113 |
| 2008/0042321 | A1* | 2/2008 | Russell ............... B41J 2/16532 264/308 |
| 2014/0268604 | A1 | 9/2014 | Wicker et al. |
| 2014/0361460 | A1 | 12/2014 | Mark |
| 2015/0018136 | A1 | 1/2015 | Goldstein et al. |
| 2017/0066187 | A1 | 3/2017 | Mark et al. |
| 2018/0015670 | A1* | 1/2018 | Gu ............... B29C 64/255 |

FOREIGN PATENT DOCUMENTS

| | | |
|---|---|---|
| CN | 104193345 A | 12/2014 |
| DE | 102004014240 A1 | 10/2005 |
| WO | WO-2014134224 A2 | 9/2014 |

* cited by examiner

SELECTIVE LASER SINTERING USING FUNCTIONAL INCLUSIONS DISPERSED IN THE MATRIX MATERIAL BEING CREATED

CROSS-REFERENCE TO RELATED APPLICATIONS

The current application is related to/claims priority under 35 U.S.C. § 119(e) to U.S. Provisional Application No. 62/171,146 filed Jun. 4, 2015 the contents of which are hereby incorporated by reference in its entirety.

TECHNICAL FIELD

The subject matter disclosed herein relates to manufacturing by laser sintering.

BACKGROUND

Laser sintering is a process in which a product, such as a part, is built layer by layer. A source, such as a laser beam, selectively fuses a predetermined portion of a layer of matrix material. The matrix material contacted by the laser is heated to a temperature above its melting point, after which adjacent particles in the matrix material are fused together as are adjacent layers of fused matrix material. To illustrate further, in laser sintering, a build piston of the build chamber is lowered by one layer thickness while a feed piston of a cartridge containing the matrix material is raised. Next, the matrix material is introduced into the build chamber where the part is to be built, and a leveling roller spreads the matrix material evenly over a build surface of the build chamber. The matrix material is then heated to a temperature below its softening point. The laser beam may then trace a predetermined cross section of the product on the layer of heated matrix material in the build surface to form a solid layer. The process may be repeated to add additional solid layers to the part being built.

SUMMARY

Methods and apparatus, including computer program products, are provided for 3D printing including selective laser sintering and the like.

In one aspect, a selective laser sintering system includes a leveling roller having a first orientation. The leveling roller is configured to roll over a first feed bin. A build chamber is configured to receive, from the first feed bin and by the leveling roller, a transfer of a portion of matrix material. The selective laser sintering system is configured to transfer the portion to the build chamber in a number of orientations.

In some implementations, the above-noted aspects may further include additional features described herein including one or more of the following. There may be a second leveling roller having a second orientation different than the first orientation. The second leveling roller may be configured to roll over a second feed bin. The first feed bin and the second feed bin may be configured to rotate about the build chamber. The first feed bin may also be configured to move about the build chamber. The build chamber may be configured to rotate about an axis. Movement of the first feed bin may be in response to commands received from a control computer. Movement of the build chamber may also be in response to commands received from a control computer.

In an interrelated aspect, a method includes receiving, by a selective laser sintering system, a first control signal from a control computer. The selective laser sintering system includes a leveling roller having a first orientation. The leveling roller is configured to roll over a first feed bin. The selective laser sintering system also includes a build chamber configured to receive, from the first feed bin and by the leveling roller, a transfer of a portion of matrix material. The selective laser sintering system is configured to transfer the portion to the build chamber in a number of orientations. An actuator operatively connected to the leveling roller and in response to the first control signal, moves the leveling roller over the first feed bin. The first feed bin contains matrix material and a second phase material that has a second phase material orientation within the matrix material. The leveling roller, during the first moving, transfers the portion of the matrix material from the first feed bin to the build chamber. The second phase material in the portion transferred to the build chamber has approximately the same orientation as the second phase material in the first feed bin. The selective laser sintering system receives a second control signal from the control computer. The actuator operatively connected to the leveling roller, in response to the second control signal, moves the leveling roller to return to a position over the first feed bin.

In some implementations, the above-noted aspects may further include additional features described herein including one or more of the following. A second leveling roller may be configured to roll over a second feed bin including another second phase material having another orientation. The second leveling roller may have a second orientation different than the first orientation. The second leveling roller may apply, as another layer to a part, the second phase material in the other orientation. The first orientation and the second orientation may be the same orientation or the first orientation and the second orientation may be different orientations. At least one of the first orientation and the second orientation may be static. The first feed bin or the build chamber may be rotated such that the second phase material will have a selected orientation relative to a part orientation for a part being manufactured in the build chamber. The second phase material may include at least one of a carbon, a metallic material, a ceramic material, a fiber, a micro-particle, a nano-particles, or a carbon nano-tube.

The first feed bin may include a number of material layers having a first layer order. Each layer may include the matrix material or the second phase material. At least one of the material layers may be transferred to the build chamber in the first layer order to manufacture a part. The part may have the layers in a second layer order that is reversed from the first layer order.

In an interrelated aspect, a control computer generates commands for a selective laser sintering system to move a first feed bin or a build chamber to a configuration such that when a portion of a matrix material and a second phase material is transferred from the first feed bin to the build chamber such that the second phase material will have a selected orientation relative to a part orientation. The control computer transmits, to the selective laser sintering system, the commands to move the first feed bin or the build chamber to form the configuration. The control computer transmits, to the selective laser sintering system, second commands to transfer the portion from the first feed bin to the build chamber.

In some implementations, the above-noted aspects may further include additional features described herein including one or more of the following. The generating may be based on a specification for the part. The part may include a layer having the second phase material at the selected orientation relative to the part orientation.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

Like labels are used to refer to same or similar items in the drawings.

DETAILED DESCRIPTION

The subject matter disclosed herein relates to laser sintering including for example three-dimensional (3D) printers.

In some example embodiments, there is provided a powder bed fusion process that may be used to create multi-phase products via laser sintering. In powder bed fusion, an energy source, such as hot air or a laser, fuses layer by layer the granular material to the product being created by the 3D printer, laser sinterer, selective laser sintering (SLS), and the like. SLS is an example of a technique for powder bed fusion.

In some example embodiments, at least another material, herein referred to as a second phase material, may be embedded in each layer in a product being created using powder bed fusion technologies, such as SLS. Examples of second phase materials may include a carbon, a metallic material, a ceramic material, a fiber, a micro-particle, a nano-particles, a carbon nano-tube, and/or the like.

In some example embodiments, functionally graded parts may be produced in which the material within the part is not homogeneous but rather contains layers of various types of inclusions which may be configured as required to for example provide functional features, such as strength, conductivity, heat resistance, and/or other part enhancing properties.

In some example embodiments, the second phase material may be included within a structural material to for example enhance the properties of the resulting product created by laser sintering, such as selective laser sintering and the like. To illustrate further, the selective laser sintering process may lay down layers of a matrix material, such as a plastic, and in that matrix material may be embedded the second phase material, such as carbon fibers to, for example, enhance the strength of the plastic body or provide other features. Likewise, additional second phase materials may be embedded in the layers as well. For example, a metallic particulate may be embedded to enhance thermal and electrical conductivity within the plastic matrix material being created via laser sintering.

In some example embodiments, the selective laser sintering may lay down the second phase material in a predetermined pattern or orientation. For example, a layer of carbon fibers may be provided in a first layer with a first orientation. Additionally or alternatively, a second layer of the carbon fibers may be provided in a second layer with a second, different orientation as part of SLS part production.

Figure 1:
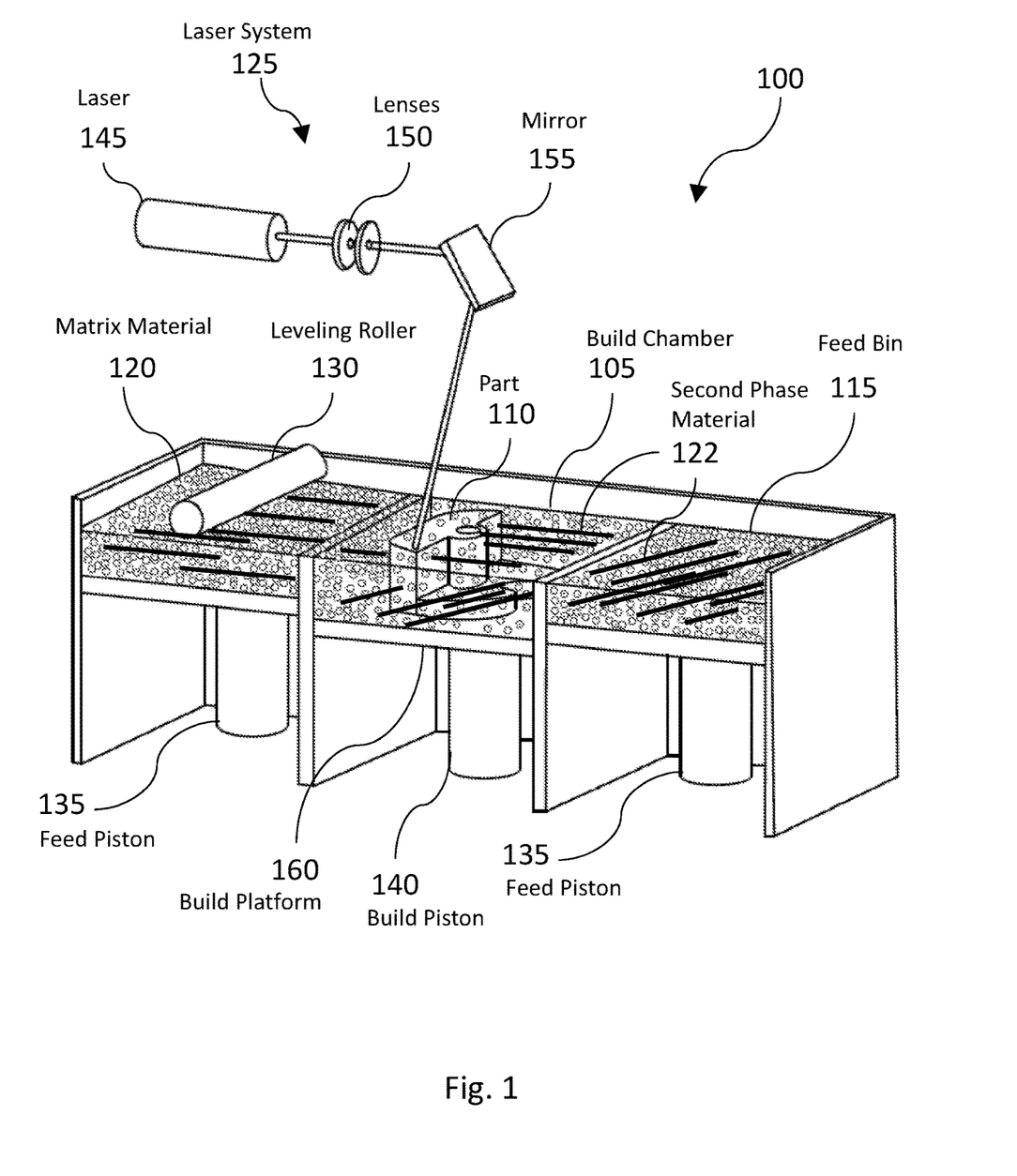
FIG. 1 depicts an example of a selective laser sintering system.

FIG. 1 depicts an example of a selective laser sintering system 100. The SLS system may include a build chamber 105 where a part 110 may be built, a feed bin 115 that supplies the matrix material 120 for building the part 110, and a laser system 125 to sinter the material in the build chamber 105 to form the part 110. In the example of FIG. 1, the SLS system may include a leveling roller 130 having a first orientation, wherein the leveling roller 130 is configured to roll over a first feed bin 115. The matrix material 120 is pushed up by the feed piston 135 to be moved by the levelling roller 130 to the build chamber 105.

The build chamber 105 may be configured to receive a transfer of a portion of matrix material 120 from the first feed bin 115 by the levelling roller 130. Once received at the build chamber 105, the laser system 125 may sinter the matrix material 120 containing the second phase material 122 to form the desired layer of the part 110. The laser system 125 may include a laser source 145, lenses 150 to focus the laser, and a scanning mirror 155 to direct the laser beam to the specified location in the build chamber 105. As the part 110 is formed, the build piston 140 lowers the build platform 160 to prepare for receiving another layer of matrix material 120.

The orientation of the leveling roller describes the direction in which the roller pushes matrix material 120 to the build chamber 105. For example, as shown in FIG. 1, there may be a feed bin on opposing sides of a build chamber 105. The orientation of the leveling roller 130 when on the left feed bin points rightward to the build chamber 105 (also shown by the arrow in FIG. 1). When the leveling roller 130 is on the right feed bin, the orientation points leftward to the build chamber 105. Again, the first orientation is relative to the build chamber 105 (or the part being constructed in the build chamber 105) and not relative to the feed bin 115. As used herein, first, second, etc. orientations refer to the orientations of first, second, etc. leveling rollers. This applies to embodiments where the feed bin and build chamber 105 move relative to each other, as described further below. As shown in the embodiments described herein, the SLS system 100 may be configured to transfer a portion of the matrix material 120 and the second phase material 122 to the build chamber 105 in a number of orientations. The options for the orientations of the second phase material 122 depend on the number of leveling rollers and the configurability of the SLS system 100.

Maintaining of Second Phase Material Orientation

Rather than include just a homogeneous pre-mix powdered matrix material 120 of, for example, plastic in both feed bins 115, a second phase material 122, such a carbon, a metallic material, a ceramic material, a fiber, a microparticle, a nano-particles, a carbon nano-tube, and/or the like, may be added to one or both of the powder feed bins in addition to the matrix material 120. In this way, as the leveling roller 130 gathers material from the feed bins for application at a given layer of the sintered part (which is the part being built in the build chamber 105), the layers may include the second phase material 122. In FIG. 1, the second phase material 122 is shown by the solid black lines suspended in the matrix material 120.

The orientation of the second phase material 122 in the layer may be the same as the orientation of the matrix material 120 (including the second phase material 122) in the feed bin. This may be done by the leveling roller 130 transferring a portion of the matrix material 120 into the build chamber 105 in a manner that does not significantly change the orientation of second phase material 122 during the transfer. As a result, the orientation of the second phase material 122 in the portion transferred to the build chamber 105 may have approximately the same orientation as the second phase material 122 in the first feed bin 115. For example, fibrous second phase material 122 may have a long axis running in substantially the same direction as the orientation of a leveling roller. The orientation of the second phase material 122 may, in some embodiments, be different than that of the orientations of the leveling rollers. For example, in the matrix material 120, there may be carbon fibers oriented parallel to the leveling roller 130. The leveling roller 130 may push the matrix material 120 perpendicular to the direction of the carbon fibers, depositing them in the build chamber 105.

In some example embodiments, the leveling roller 130(s) may align the material, such as carbon fibers, carbon nanotubes, a ceramic material, a metallic material, and/or other particles in a predetermined orientation. For example, the orientation of the leveling rollers 130 may be used to align the material, such as the carbon fibers and/or the like, being included in the layer being applied at the sintered part.

In some example embodiments, a plurality of leveling rollers 130 may be used to apply the layers including the additional material, such as carbon fibers, carbon nanotubes, a ceramic material, a metallic material, and/or other particles in a predetermined orientation.

Two-Roller System

Figure 2:
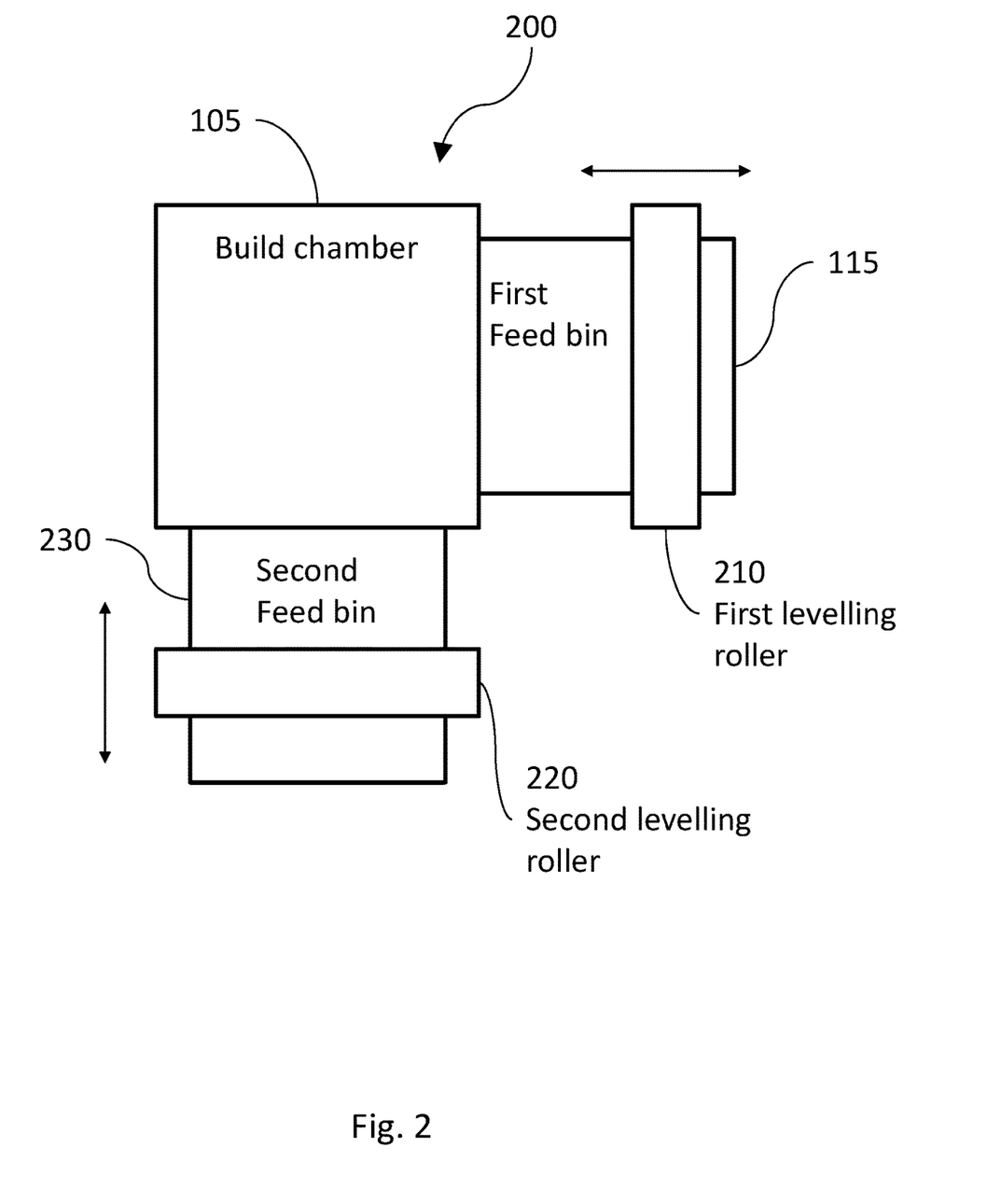
FIG. 2 depicts a selective laser sintering system including rollers with different orientations, in accordance with some example embodiments.

FIG. 2 depicts a selective laser sintering system 200 including rollers with different orientations, in accordance with some example embodiments. The example depicted at FIG. 2 shows the first leveling roller 210 at a first orientation. Additionally, a second leveling roller 220, with a second orientation different than the first orientation, may be configured to roll over a second feed bin 230.

To illustrate further, the first leveling roller 210 may roll over the first feed bin 115 which may include matrix material 120 (for example, plastic) and/or the second phase material 122, such as the carbon fibers, carbon nanotubes, a ceramic material, a metallic material, and/or other particles that provide an inclusion in the matrix material 120. A build piston at the bottom each of the feed bins may push up on the floor of the bin to supply the feed including the first phase and/or second phase material 122. The first leveling roller 210 may then roll and thus apply its layer on the sintered part located at the build platform.

The second roller 220 may roll over the second feed bin 230 which may also include a matrix material 120 and/or a second phase material 122 (which may be the same or different than the stock in the first feed bin 115). The second leveling roller 220 may then roll over the second feed bin 230 and thus apply its layer on the sintered part located at the build platform. The other layer may then contain the second phase material 122 another other orientation different from the orientation of the layer applied from the first feed bin 115.

Although FIG. 2 depicts two leveling rollers 130 and two feed bins including the second phase material 122, other quantities of leveling rollers 130 and feed bins may be used as well.

Movable Single Feed Bin

Figure 3:
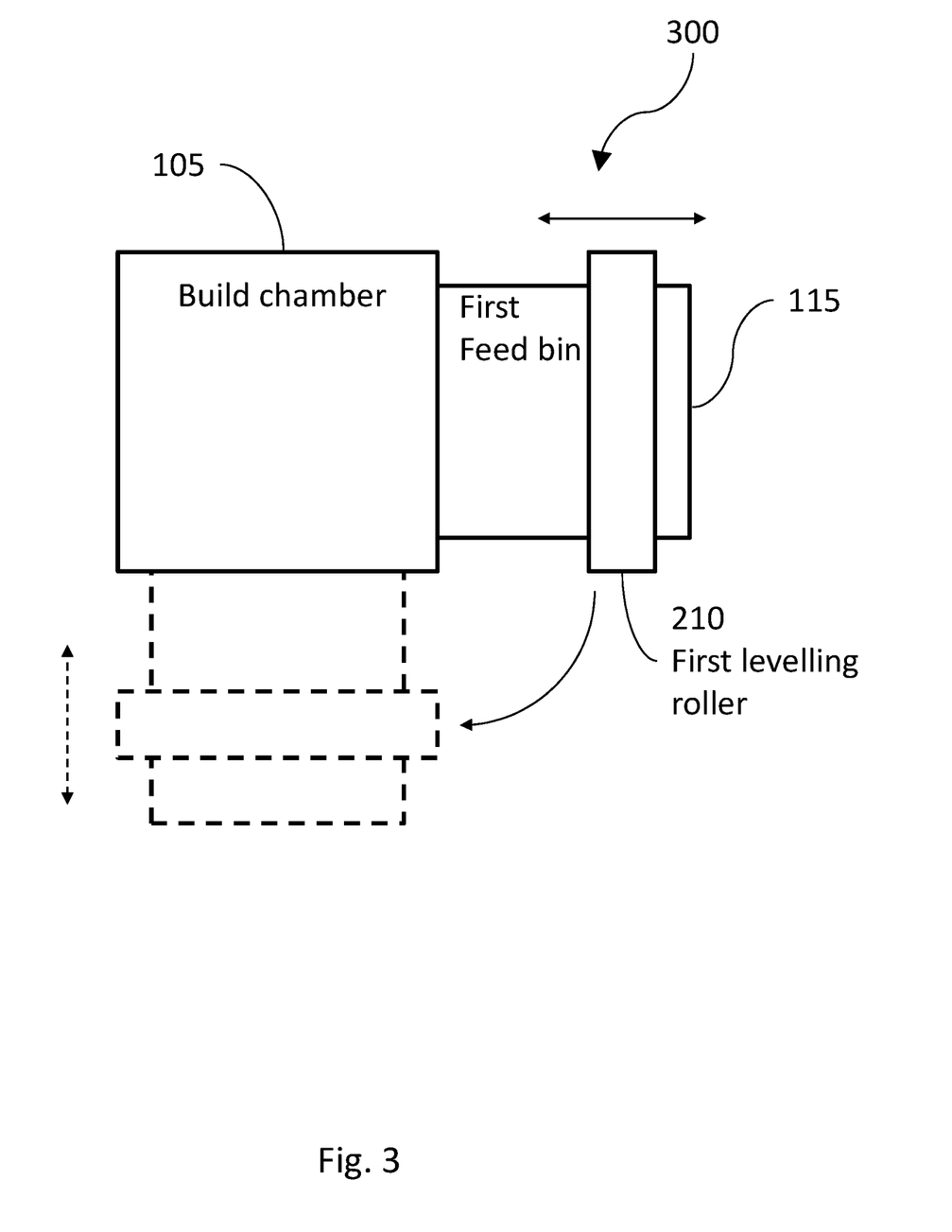
FIG. 3 depicts a selective laser sintering system including a single movable feed bin and static build chamber, in accordance with some example embodiments.

FIG. 3 depicts a selective laser sintering system 300 including a single movable feed bin and static build chamber 105. In some embodiments, the first feed bin 115 or the build chamber 105 may be configured to move relative to the other. The embodiment of FIG. 3 depicts the first feed bin 115 configured to rotate about the build chamber 105. By rotating the first feed bin 115 about the build chamber 105, the second phase material 122 may be transferred to the build chamber 105 in different orientations, while using only one feed bin. As the feed bin and build chamber 105 are depicted as rectangular, they may need to be separated in the process of rotation, in order to clear the corner of the build chamber 105.

Figure 4:
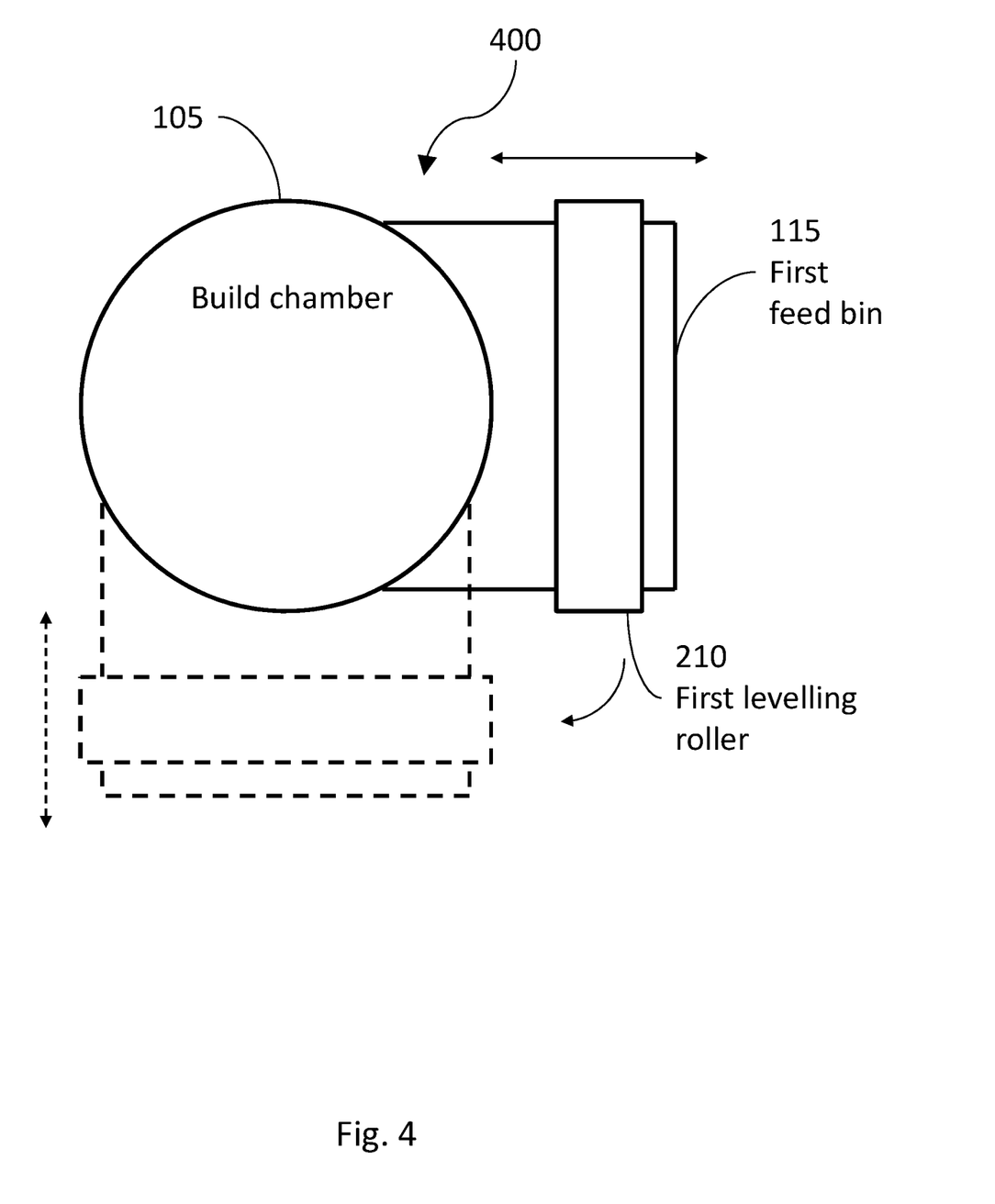
FIG. 4 depicts a selective laser sintering system including a single movable feed bin and static round build chamber, in accordance with some example embodiments.

FIG. 4 depicts a selective laser sintering system 400 including a single movable feed bin and static round build chamber 105, in accordance with some example embodiments. Here, the build chamber 105 may be circular in shape and abutting a feed chamber shaped to partially surround a circumference of the build chamber 105. As shown by the arrow, the first feed bin 115 may be configured to rotate about the build chamber 105. This may advantageously allow for the second phase material 122 to be transferred to the build chamber 105 at an arbitrary orientation relative to the build chamber 105 or the part being constructed. The feed chamber may also move away from the build chamber 105 if additional clearance is desired.

Rotating Build Chamber

Figure 5:
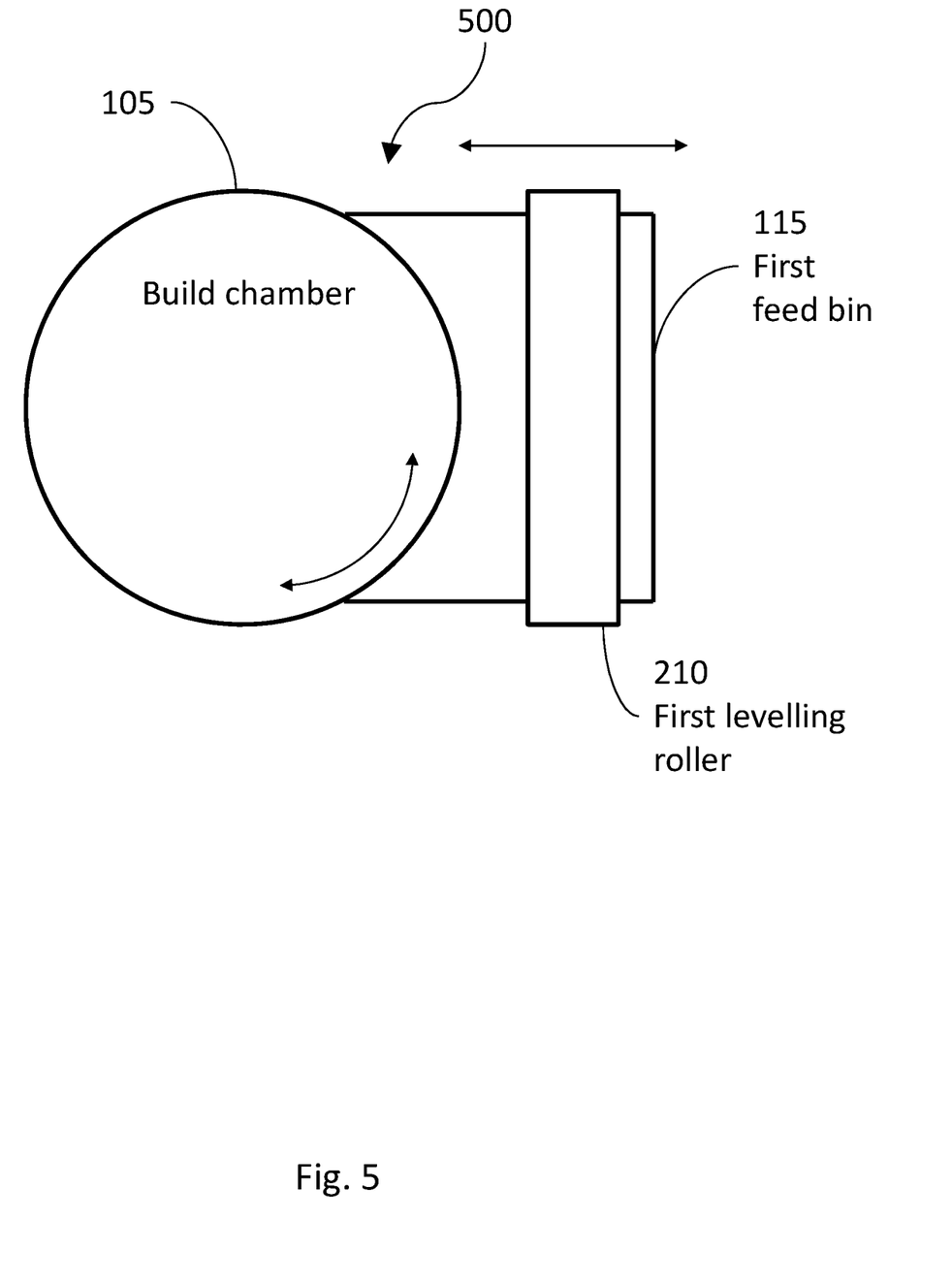
FIG. 5 depicts a selective laser sintering system including a rotating round build chamber and static feed bin, in accordance with some example embodiments.

FIG. 5 depicts a selective laser sintering system 500 including a rotating round build chamber 105 and static feed bin 115, in accordance with some example embodiments. Instead of the feed bin 115 being configured to rotate about the build chamber 105 as in FIG. 4, the build chamber 105 may rotate on an axis while the feed bin 115 remains static. As shown in FIG. 5, the orientation of the second matrix material 120 may be varied in the build chamber 105 by rotating the build chamber 105 to any desired position. The first orientation and the second orientation may be the same orientation. This may occur, for example, when it is desired to apply different materials (from different feed bins), but the orientation of the second phase material 122 in each case is desired to be the same. This may also occur if more than one feed bin 115 is desired in to provide a longer run time before having to refill the feed bin(s).

Rotating Build and Feed Bins

Figure 6:
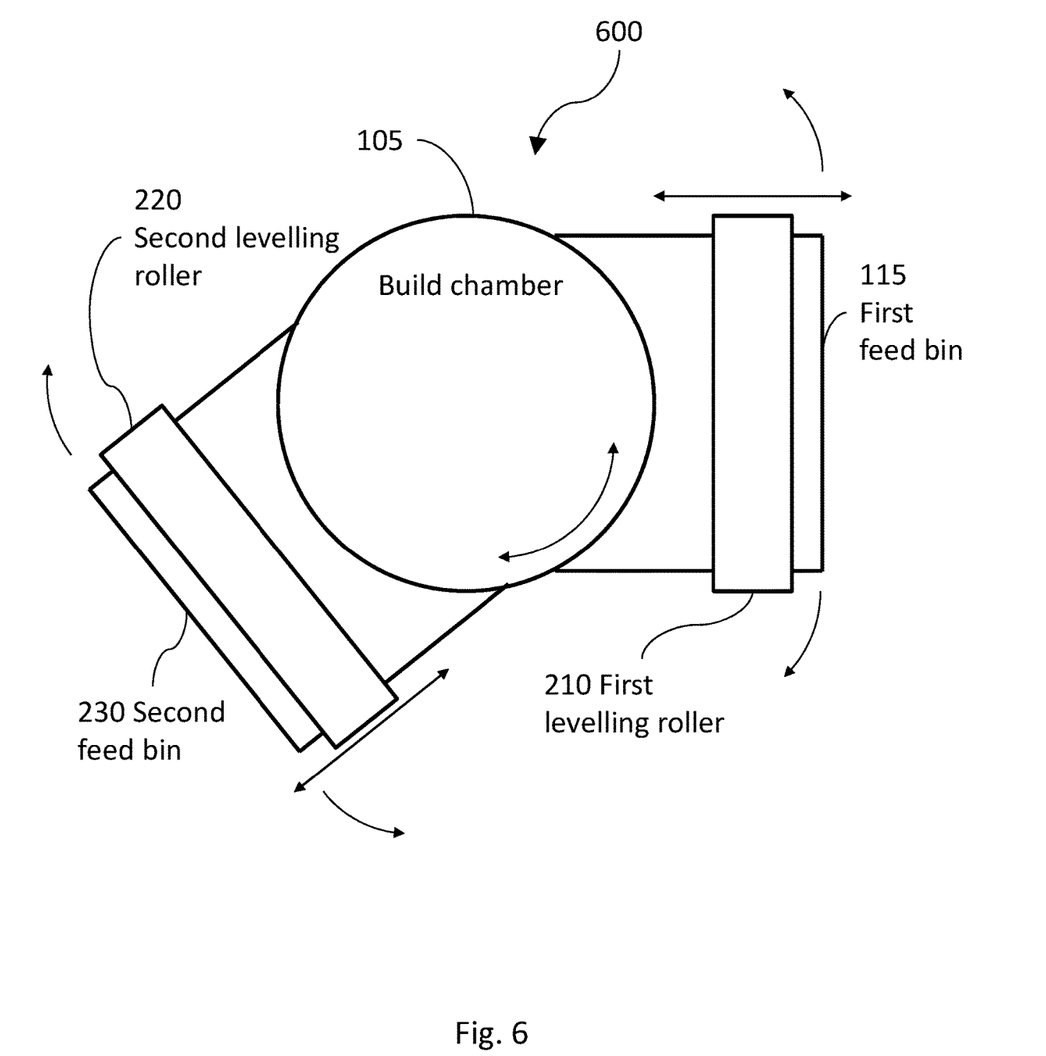
FIG. 6 depicts a selective laser sintering system including two movable feed bins and rotating round build chamber, in accordance with some example embodiments.

FIG. 6 depicts a selective laser sintering system 600 including two movable feed bins and rotating round build chamber 105, in accordance with some example embodiments. As described above, there may be any number of feed bins interfaced to provide material to the build chamber 105.

One example embodiment shown in FIG. 6 depicts a rotating build chamber 105, similar to that shown in FIG. 5, but combined with a first feed bin 115 and a second feed bin 230 configured to rotate about the build chamber 105, similar to that shown in FIG. 4. The feed bins, in whatever number or disposition about the build chamber 105, may be static or movable. In some embodiments, the first feed bin 115 or the build chamber 105 may be rotated such that the second phase material 122 will have a selected orientation relative to a part orientation for a part being manufactured in the build chamber 105. This combination of feed bins and build chamber 105 provides additional flexibility with regard to the available types and orientation of the second phase materials 122.

Electronic Control of SLS System Components

Figure 7:
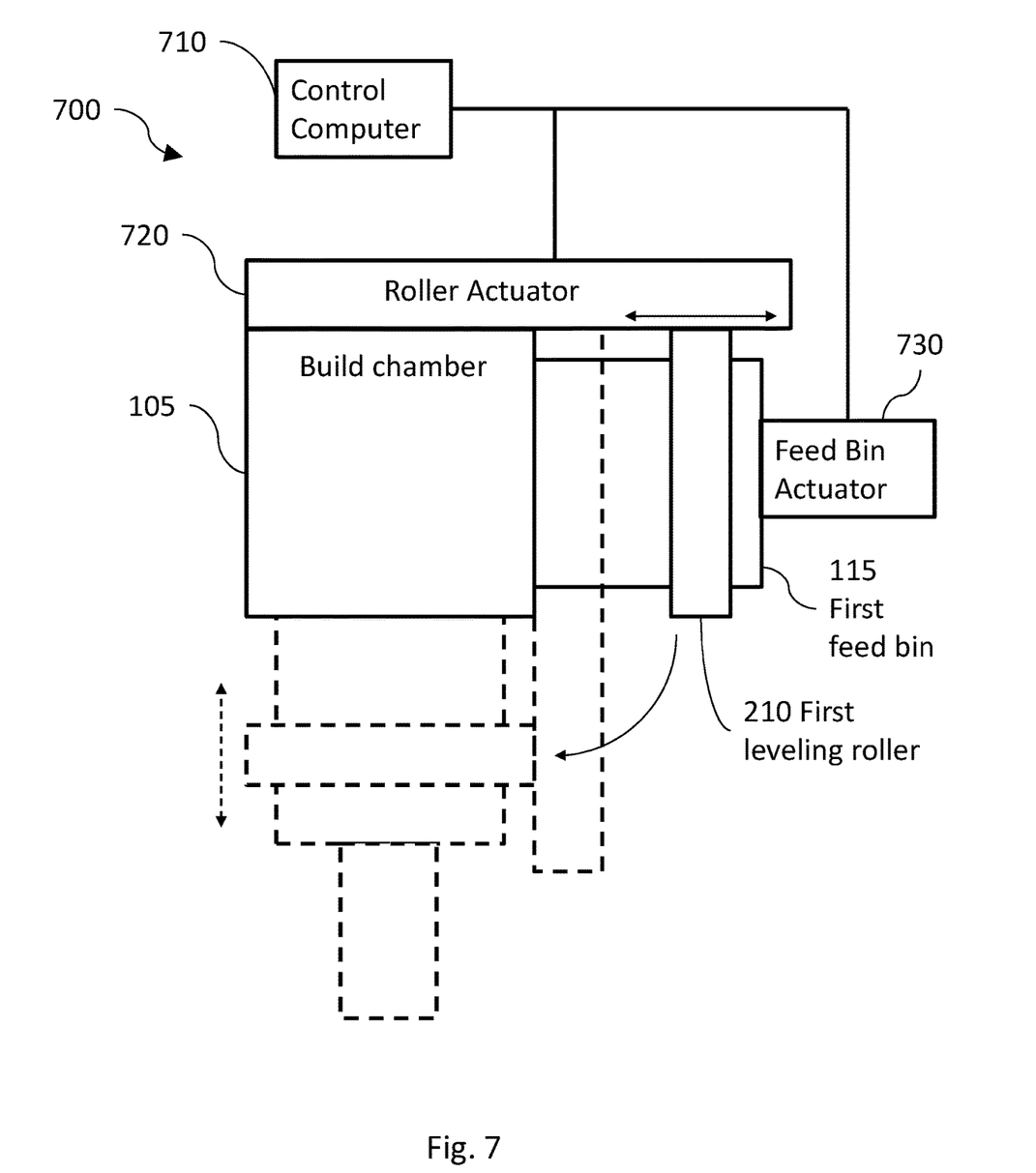
FIG. 7 depicts an example configuration of the selective laser sintering system including a control computer, in accordance with some example embodiments.

FIG. 7 depicts an example configuration of the selective laser sintering system 700 including a control computer 710, in accordance with some example embodiments.

In some example embodiments, the orientation of the first leveling roller 210 and the second leveling roller 220 may, as noted, be configured to orient the second phase material 122 in a predetermined orientation. The configuration of the orientation of the first leveling roller 210 and/or the second leveling roller 220 may be configured electronically, such that the orientation may be changed from layer to layer, or may be configured in a fixed orientation for a given system.

To effect a particular configuration of the SLS system, the movement of the first feed bin 115, second feed bin 230, or the build chamber 105 may be in response to commands received from a control computer 710. In one embodiment, shown in FIG. 7, the control computer 710 may generate commands for the SLS system to move (shown by the curved arrow) a first feed bin 115 (or a build chamber 105) to a configuration such that when a portion of a matrix material 120 and a second phase material 122 is transferred from the first feed chamber to the build chamber 105 that the second phase material 122 will have a selected orientation relative to a part orientation.

The electronic configuration may be implemented by the control computer 710 receiving and interpreting a specification for the part. The specification may describe that the part is to include a layer having the second phase material 122 at the selected orientation relative to the part orientation. The control computer 710 may then transmit commands to roller actuators 720, feed bin actuators 730, or build chamber 105 actuators (not shown), to generate the required configuration of the SLS system 700. The actuators 720 may be coupled to a leveling roller in order to move the leveling roller from its respective feed bin to the build chamber and back. Actuators may include, for example, gears, bearings, belts, pneumatic actuators, magnetic actuators, and the like. Operation of the actuators connected to the leveling roller may be used to transfer, by rolling, scraping, scooping, and the like, the matrix material 120 and the second phase material 122 to the build chamber 105. The feed bin actuator 730 (or a build chamber actuator) may also be a motor, track, gears, belts, axles, or any combination thereof for moving the feed bin 115 (or build chamber 105). Once the SLS system 700 is in the desired configuration, the second phase material 122 may be applied to the part and sintered to form a layer with the second phase material 122 in the desired orientation.

Figure 8:
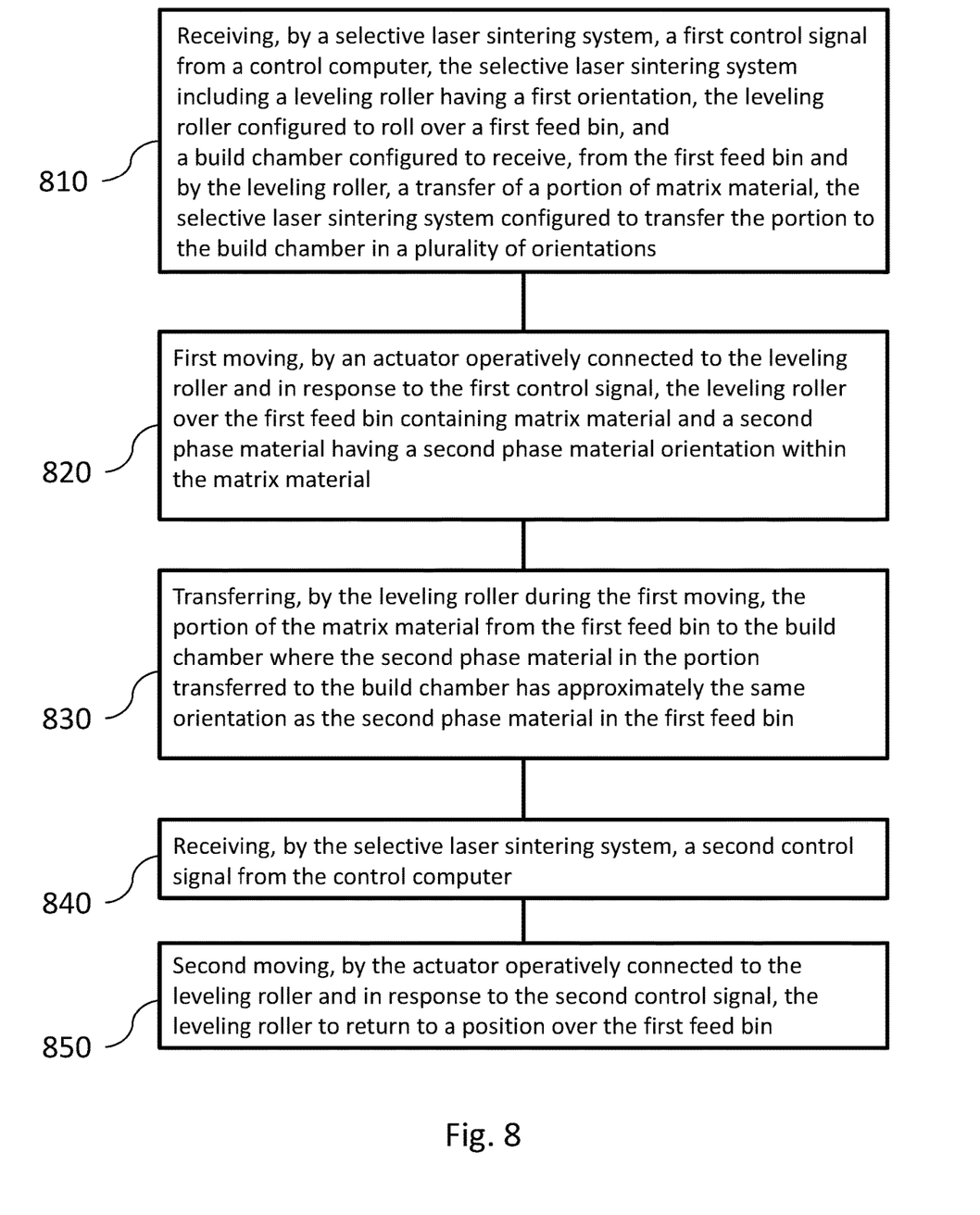
FIG. 8 is a process flow diagram illustrating a method according to some example embodiments.

FIG. 8 is a process flow diagram illustrating a method according to some example embodiments.

At 810, the selective laser sintering system 700 (referring also to FIG. 7) may receive a first control signal from the control computer 710. In this example method, the selective laser sintering system 100 may include a leveling roller 210 having a first orientation, where the leveling roller 210 is configured to roll over a first feed bin 115. There may also be a build chamber 105 configured to receive, from the first feed bin 115 and by the leveling roller 130, a transfer of a portion of matrix material 120. The selective laser sintering system 100 may be configured to transfer the portion to the build chamber 105 in a number of orientations.

At 820, an actuator 720 operatively connected to the leveling roller 210 may move the leveling roller 210 over the first feed bin 115 in response to the first control signal. The control signals may be analog or digital electrical signals, which may, for example, power the actuator and/or the leveling roller or instruct another computer to execute the desired operation. Again, the first feed bin 115 may contain matrix material 120 and a second phase material 122 having a second phase material orientation within the matrix material 120. These materials may be transferred to the build chamber 105.

At 830, the leveling roller 210 may transfer, during the first moving, the portion of the matrix material 120 from the first feed bin 115 to the build chamber 105. The second phase material 122 in the portion transferred to the build chamber 105 may have approximately the same orientation as the second phase material 122 in the first feed bin 115.

At 840, the selective laser sintering system 100 may receive a second control signal from the control computer 710.

At 850, the actuator 720, operatively connected to the leveling roller 210, may move the leveling roller 210 to return to a position over the first feed bin 115 in response to the second control signal. In this way, the leveling roller 210 may repeatedly transfer the matrix material 120 and the second phase material 122 to the build chamber 105.

Graded Layer Construction

The part(s) built using the second phase material 122 provided by roller 215 and/or roller 220 may, as noted, allow for the creation of functionally graded parts that include different properties along the height of the part. For example, with reference to FIG. 1, the feed bin 115 may include a plastic matrix material 120 and a second phase material 122 a metal that enhances conductivity of the sintered part, while the opposing feed bin at may include a plastic and a second phase material 122 comprising a carbon fiber that enhances the strength of the sintered part. Moreover, the rollers and/or may build layers having aligned fibers in alternating orientations to enhance mechanical properties of the part.

To illustrate further, with reference to FIG. 2, different powders and materials such as carbon nanotubes and the like, may be placed into different feed bins 115. As the powder is pushed up from a feed bin 115, a roller may move the powder across the feed bins 115 and a laser will melt the powder to a layer of hardened composite. A first feed bin 115 may have a piston pushing up more material than the other piston that rolls over a second feed bin 230. The pistons may be programmed to vary the percentage of powder being pushed onto the surface to be melted into a composite in order to create a graded composite.

At least three types of build modalities for functionally graded materials may be provided. First, rather than a homogeneous material, functionally graded material may be built by spreading different types of materials in layers in the feed bins to get a final sintered product that may have additions to some of its layers as the sintered product is built up to make the sintered product stronger (such as adding carbon fibers, for example) or have other properties. For example, as the sintered product is built, it may include a layer with conductive properties at certain layers but not others. To illustrate further, the top of the sintered part may include the conductive layers (provided by for example a metallic second phase material 122). When this is the case, the feed bin 115 may at some point include conductive particles in the mix. Moreover, two different feed bins may be used to spread different types of layers of given thickness. For example, if the left feed bin contains carbon particles mixed with nylon while the right feed bin contains only the nylon powder, the system may use the right feed bin when needed (for example, when a layer requires a conductive layer 1 mm thick). Third, carbon fibers/powders may be used in the feed bins 115, and these carbon fibers may be aligned in alternating orientation in subsequent layers to enhance mechanical strength of the resulting part. When a first leveling roller 210 swipes over the top layer of fibers in the feed bin 115, the long axis of fibers tend to orient themselves along the long axis of the rollers. If the second leveling roller 230 is moving in the transverse direction to the first roller (in this case the second feed bin may be located to the side as presented in FIG. 2), then alternative movements of two rollers may deposit layers of the fibers with alternating directions. In this case, the fibers might be mixed with the matrix material 120 (such as nylon).

Cross-Hatched Layering

Moreover, the second leveling roller 220 may, as shown in FIG. 2, be placed in a perpendicular position to the first leveling roller 210. When this is the case, the first layer may contain second phase material 122 with an orientation in the "x" direction, and the second layer may contain second phase material 122 with an orientation in the "y" direction. The angles of the rollers may be varied so that the second phase material 122 may be oriented at 45 degrees rather than 90 degrees, although other angles of orientations may be implemented as well. Moreover, the orientations may be varied from layer to layer. The cross-hatched layers may provide a stronger composite. In some embodiments, the transfer of the second phase material 122 from the feed bins may be done to randomize the orientation of the second phase material 122 in the build chamber 105. This randomized orientation may, in some cases, provide electrical or thermal conductive paths through one or more layers of the part 110.

Composition of Material in Feed Bins

The second phase material 122 may be pre-mixed in the feed bin that includes the matrix material 120 that is used to build the sintered part. In a system having a single feed bin for example, the matrix material 120 and second phase material 122 may be pre-mixed and applied by a single roller. Alternatively or additionally, in a system having two feed bins for example, the matrix material 120 and second phase material 122 may be pre-mixed and applied by each of the rollers. Alternatively or additionally, when a plurality of feed bins are implemented, a first feed bin may include a matrix material 120 (such as nylon powder) and another other bin may include the second phase material 122 such as carbon fibers and/or the like, although the second bin may include the matrix material 120 and second phase material 122 as well.

The second phase material 122 may comprise a single additive or a plurality of functional additives. For example, a feed bin may include a mix of metal beads (for example, to increase heat conduction) and/or carbon fibers (to enhance mechanical properties). Since two feed bins may be used alternatively to spread the material during successive build layers, layered structures may be produced having the materials supplied by the two feed bins (which may include the same or different nylon powder and second phase material 122(s). Using this process, the bins may include materials which may not melt during the build process (for example, the nylon powder may melt as a result of the laser system 125 but the second phase material 122 may not need to be melted as the second phase material 122 may be held by the surrounding melted plastic).

Figure 9:
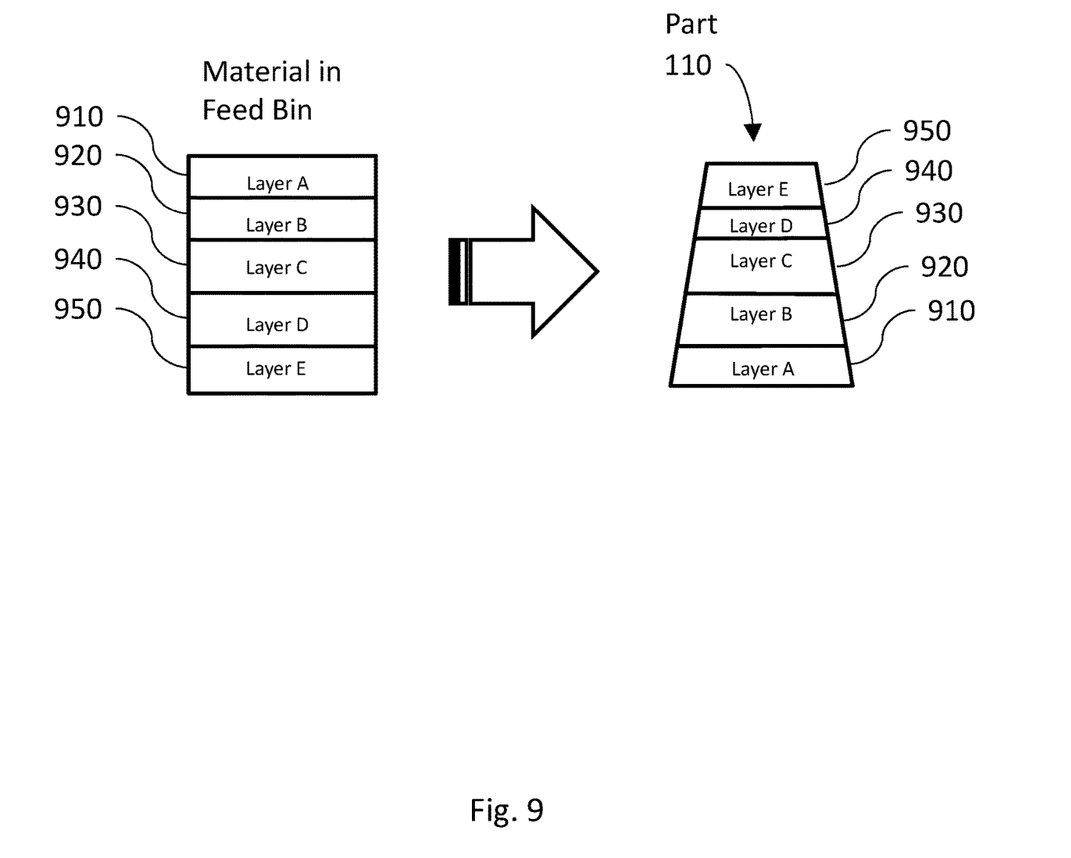
FIG. 9 depicts the construction of a part with layers in reverse order than that of layered material in the feed bin.

FIG. 9 depicts the construction of a part 110 with layers in reverse order than that of layered material in the feed bin. As described above, the sintering process, in particular when making a functionally graded structure, may involve application of successive layers of matrix material 120 and/or second phase material 122. In some embodiments, a feed bin may include a materials arranged in a number of material layers having a layer order. Each layer may include at least one of the matrix material or the second phase material. During the manufacturing process, the material layers may be transferred to the build chamber in the layer order to create the part. As a result, the part can result in having the layers, but in a layer order that is reversed from the original layer order as it was in the feed bin.

As shown in FIG. 9, as one example, material in a feed bin can have five layers, A through E. Each layer may be different, for example, layer A 910 may be polystyrene, layer B 920 may be carbon, layer C 930 may be matrix material 120 (e.g. nylon), layer D 940 may be matrix material with fibers, and layer E 950 may be matrix material 120 with metallic additives. After the part 110 is completed, the layers may be in the reversed order shown in FIG. 9.

Though only one example of layered material in a single feed bin is shown, there can be multiple feed bins that may have a different layering order. They may also have different numbers or compositions of materials in them. The order of transfer of material from the feed bins containing the layered materials may be used to create many layers of differing composition or orientations of second phase material. In some embodiments, the layering process in the feed bins can be used to replace or augment some feed bins. For example, as shown in FIG. 9, by layering the materials in a single feed bin, this may be done instead of having an SLS system 100 that includes five different feed bins, each holding a single composition of material.

The subject matter described herein may be embodied in systems, apparatus, methods, and/or articles depending on the desired configuration. Moreover, the control of one or more of the operations disclosed herein, such as control of the SLS system, may be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

The different functions discussed herein may be performed in a different order and/or concurrently with each other. Furthermore, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments of the invention, these descriptions should not be viewed in a limiting sense. Rather, there are several variations and modifications, which may be made without departing from the scope of the present invention as, defined in the appended claims. The term "based on" includes "based on at least."

What is claimed:

1. A selective laser sintering system comprising:
   a first leveling roller having a first orientation, wherein the first leveling roller is configured to roll over a first feed bin; and
   a build chamber configured to receive, from the first feed bin and by the first leveling roller, a transfer of a portion of matrix material, the selective laser sintering system configured to transfer the portion to the build chamber in a plurality of orientations;
   wherein the first leveling roller and the first feed bin are each configured to rotate around a central axis of the build chamber, wherein the build chamber is static relative to the first feed bin and the first leveling roller.

2. The selective laser sintering system of claim 1 further comprising:
   a second leveling roller having a second orientation different than the first orientation, the second leveling roller configured to roll over a second feed bin.

3. The selective laser sintering system of claim 2, wherein the second feed bin and the second leveling roller are each configured to rotate about the build chamber, wherein the build chamber is static relative to the second feed bin and the second leveling roller, and wherein the first leveling roller is coupled to the first feed bin and the second leveling roller is coupled to the second feed bin.

4. The selective laser sintering system of claim 1, wherein the first feed bin is configured to move about the build chamber.

5. The selective laser sintering system of claim 1, wherein movement of the first feed bin is in response to commands received from a control computer.

6. A selective laser sintering system comprising:
   a leveling roller having a first orientation, wherein the leveling roller is configured to roll over a first feed bin; and
   a build chamber configured to receive, directly from the first feed bin and by the leveling roller, a transfer of a portion of matrix material,
   wherein the leveling roller is configured to transfer the portion of matrix material, in a plurality of orientations, directly from the first feed bin to the build chamber, the plurality of orientations comprising the first orientation and a second orientation different from the first orientation,
   wherein the first feed bin contains the matrix material and a second phase material having a second phase material orientation within the matrix material,
   wherein the second phase material in the portion transferred from the first feed bin to the build chamber has approximately a same orientation as the second phase material in the first feed bin,
   wherein the first feed bin and the leveling roller are configured to rotate about a center of the build chamber,
   wherein the build chamber is static relative to the first feed bin, and
   wherein the leveling roller is coupled to the first feed bin.

7. The selective laser sintering system of claim 6, further comprising:
   a second leveling roller having a third orientation different than the first orientation, the second leveling roller configured to roll over a second feed bin,
   wherein the second feed bin and the second leveling roller are each configured to rotate about the build chamber,
   wherein the build chamber is static relative to the second feed bin and the second leveling roller, and
   wherein the second leveling roller is coupled to the second feed bin.

* * * * *